United States Patent [19]

Rudolph

[11] 4,183,478

[45] Jan. 15, 1980

[54] JET THRUST REVERSER

[75] Inventor: Peter K. C. Rudolph, Seattle, Wash.

[73] Assignee: The Boeing Company, Seattle, Wash.

[21] Appl. No.: 854,554

[22] Filed: Nov. 25, 1977

[51] Int. Cl.² ............................................. B64C 15/04
[52] U.S. Cl. ............................. 244/110 B; 60/226 A; 239/265.29
[58] Field of Search ................. 244/110 B, 53 R, 216; 239/265.19, 265.23, 265.29, 265.31, 265.37; 60/230, 226 A

[56] References Cited

U.S. PATENT DOCUMENTS

| | | | |
|---|---|---|---|
| 2,932,164 | 4/1960 | Watson | 60/230 |
| 3,035,411 | 5/1962 | Porowski | 239/265.29 |
| 3,612,399 | 10/1971 | Rodgers et al. | 239/265.37 |
| 3,863,867 | 2/1975 | Souslin et al. | 244/110 B |
| 3,915,415 | 10/1975 | Pazmany | 244/110 B |
| 3,981,463 | 9/1976 | Pazmany | 60/226 A |
| 4,030,291 | 6/1977 | Sargisson | 239/265.29 |

FOREIGN PATENT DOCUMENTS

| | | | |
|---|---|---|---|
| 1259348 | 3/1961 | France | 239/265.29 |
| 388029 | 5/1965 | Switzerland | 239/265.37 |
| 933612 | 8/1963 | United Kingdom | 60/230 |

Primary Examiner—Galen L. Barefoot

Attorney, Agent, or Firm—Thomas H. Murray

[57] ABSTRACT

A cascade/clamshell thrust reverser combination for jet engines wherein the clamshell door in the full-forward thrust mode position, covers a cascade arrangement of vane members provided in the annular engine casing. For obtaining the thrust reverser mode, a track and pivot mechanism is employed. Initially, the door moves backwards on the track while simultaneously slightly rotating so that the total movement of the door follows a predetermined arc. During this initial movement the first portion of the vanes are gradually exposed. Upon continuation towards the full reverser mode, the door will move into a rotating movement thereby fully exposing all vanes and closing the forward thrust nozzle opening. The successive combined track/pivot movement to a pivot rotating movement allows for the maneuvering of a maximum large structural sized clamshell door within the multiple contoured confines of the exit casing, thereby providing the most optimum thrust reverser effect. The invention further resides in tailoring or varying the discharge angles of the vane members of the cascade from front to rear to maintain the effective discharge area for the engine essentially constant during inflight partial deployment of the clamshell door.

11 Claims, 13 Drawing Figures $F_{REV.} = .5 \times F_{GROSS}$
UNTAILORED CASCADE
CONSTANT 30°
DISCHARGE ANGLE $F_{REV.} = .866 \times F_{GROSS}$
TAILORED CASCADE
60° DISCHARGE ANGLE IN
FORWARD POSITION

JET THRUST REVERSER

BACKGROUND OF THE INVENTION

It is, of course, well known to incorporate thrust reversal means on jet engines to effect deflection of the exhaust efflux of the engine in a generally forward direction and provide aerodynamic braking during landing (i.e., after touch-down). Typically, thrust reversal means for jet engines takes the form of large, so-called deflector or clamshell doors mounted aft of the engine thrust nozzle, which doors are movable into the path of the engine exhaust gases to deflect them forwardly. In certain cases, the deflector doors pivot into positions where they protrude beyond the engine nacelle and can cause an engine backpressure problem at high forward speeds and low throttle settings. Protruding doors of this type are aerodynamically unsafe and cannot be used for inflight deployment to improve steep descent and glide slope control capabilities.

In an effort to utilize the thrust reversing capabilities for ground and for inflight deployment, cascade/clamshell thrust reversers have been devised in which the clamshell door or doors themselves do not protrude beyond the engine nacelle, even when in the thrust-reversing position. In this type of reverser, the exhaust gases from the jet engine are directed through a cascade of vane members in the nacelle wall. If the clamshell doors are pivoted about a single pivot point, as is usual, problems arise in that the single pivoting door does not expose sufficient open area and has a tendency to wipe through the area where the cascade of vane members should be located.

SUMMARY OF THE INVENTION

In accordance with the present invention, a cascade/clamshell thrust reverser is provided which is aerodynamically failsafe, meaning that the airloads on the clamshell door tend to move it into the stowed (i.e., safe) position. As a result, it can be used not only as a ground thrust reverser, but is also suitable for safe inflight reversing for descent and glide control purposes. The cascade area opened up by the clamshell door of the invention is large enough to permit sufficient flow turning while meeting the area requirements for engine match. Furthermore, the open area is large enough to permit a certain degree of flow control of the reverser efflux to reduce rudder blanking during reverser operation. By varying the discharge areas of the vane members of the cascade such that those at the forward end of the engine nacelle assume a greater forward angle than those at the rear, the reverser effectiveness is increased; and, at the same time, the reverse thrust download on the aircraft is reduced during partial deployment of the clamshell door.

Specifically, there is provided a jet-propulsion power plant having an annular engine casing and a jet engine included within the casing at the forward end thereof. The thrust reverser itself comprises a cascade of vane members in the wall of the casing at the trailing end thereof and beyond the primary exhaust nozzle of the engine. A generally semicircular clamshell door in stowed away position covers the cascade. Track means are provided which extend generally parallel to the longitudinal axis of the casing means and along the interior wall thereof beneath the cascade. A slide block is reciprocable on each of the track means; and these slide blocks are pivotally connected to the forward end of the door. Arm means are pivotally mounted in the engine casing means and have a free end pivotally connected to the trailing end of the door, the arrangement being such that upon rotation of the arm means in one direction by a suitable actuator, the door will move backwardly on the track means to expose the cascade, while continued rotation of the arm means acts to pivot the door about its connection to the reciprocable slide blocks to at least partially close the exit end of the engine casing and direct exhaust efflux from the engine through the cascade to produce reverse thrust.

The most important object of the present invention comprises a clamshell/cascade thrust reverser system for upper surface blowing wing aircraft, wherein a clamshell door structure of optimum size is arranged for movement from a forward thrust to a reverse thrust mode along a perdetermined arc of rotation within the confines of the engine casing while simultaneously discharging an increasing constant reverser flow and providing maximum reverse thrust efficiency.

It is another object of the present invention to utilize a maximum sized reverser door within the specific confines of an engine exit area having an annular cross-sectional and an aerodynamically sloped longitudinal contour by providing to the door a sliding and slightly turning movement to a rotational movement successively within the contoured engine casing from forward to reverse thrust mode in combination with a discharge guide means for efficient and effective constant discharge of thrust flow.

The above and other objects and features of the invention will become apparent from the following detailed description taken in connection with the accompanying drawings which form a part of this specification, and in which.

Figure 6A:
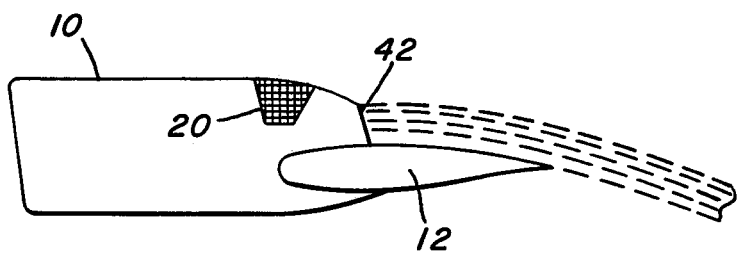
Figure 6B:
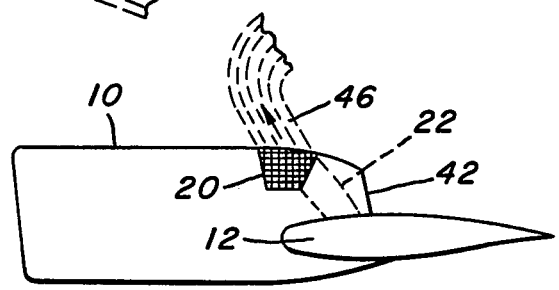
Figure 6C:
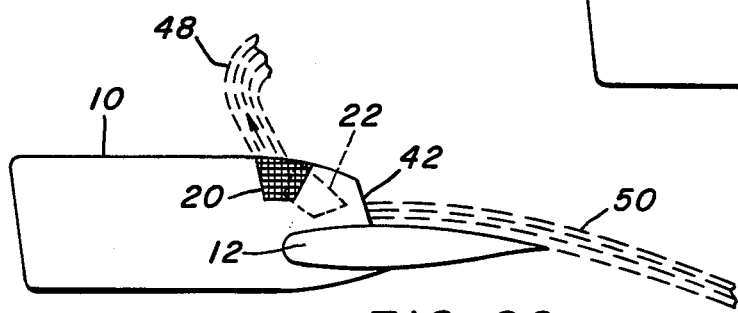
Figure 7:
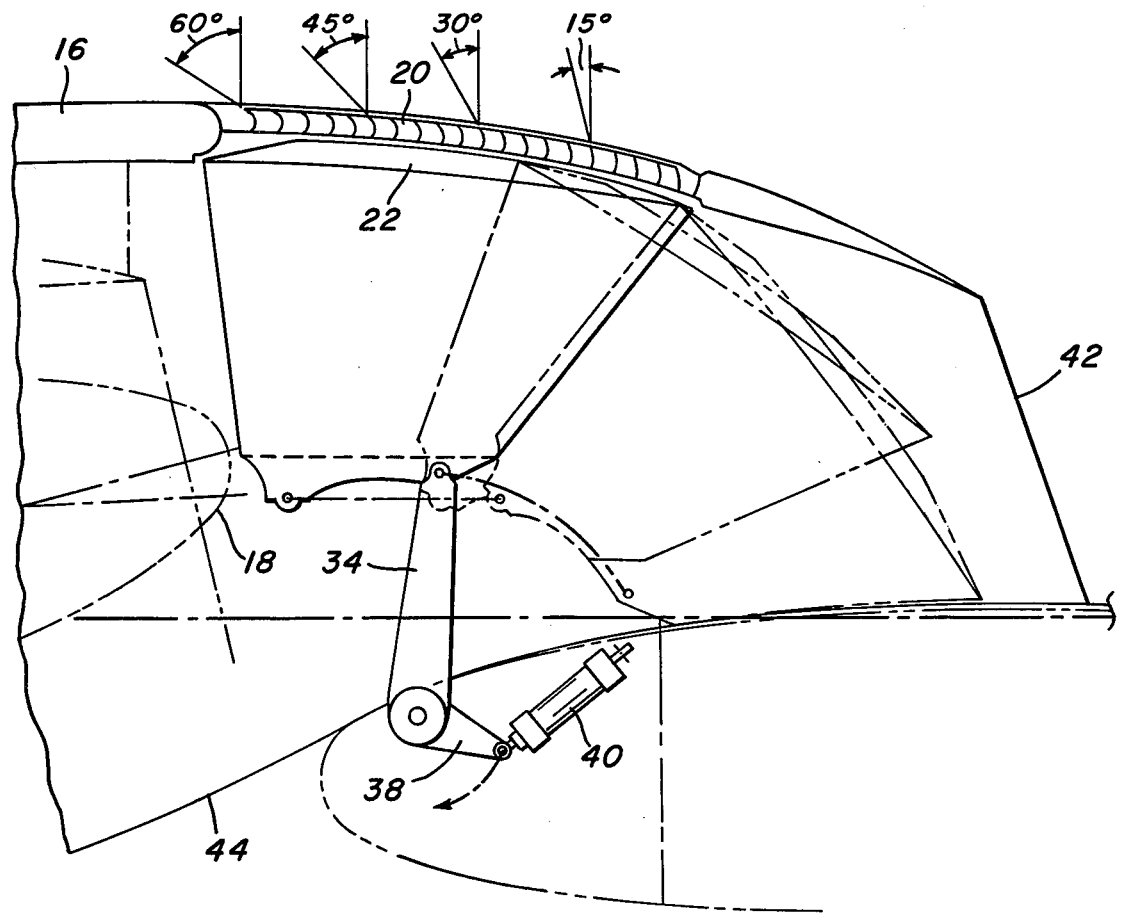
Figure 8B:
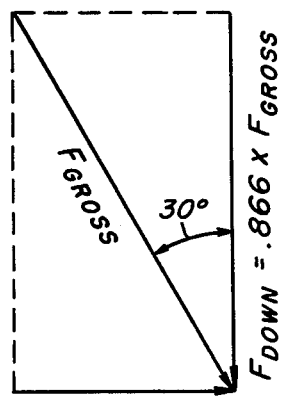
Figure 8A:
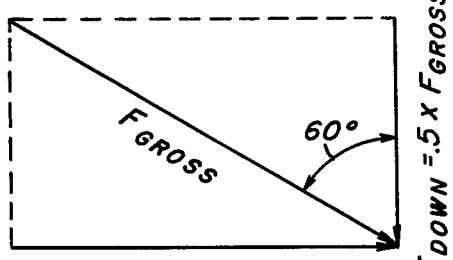
Figure 9:
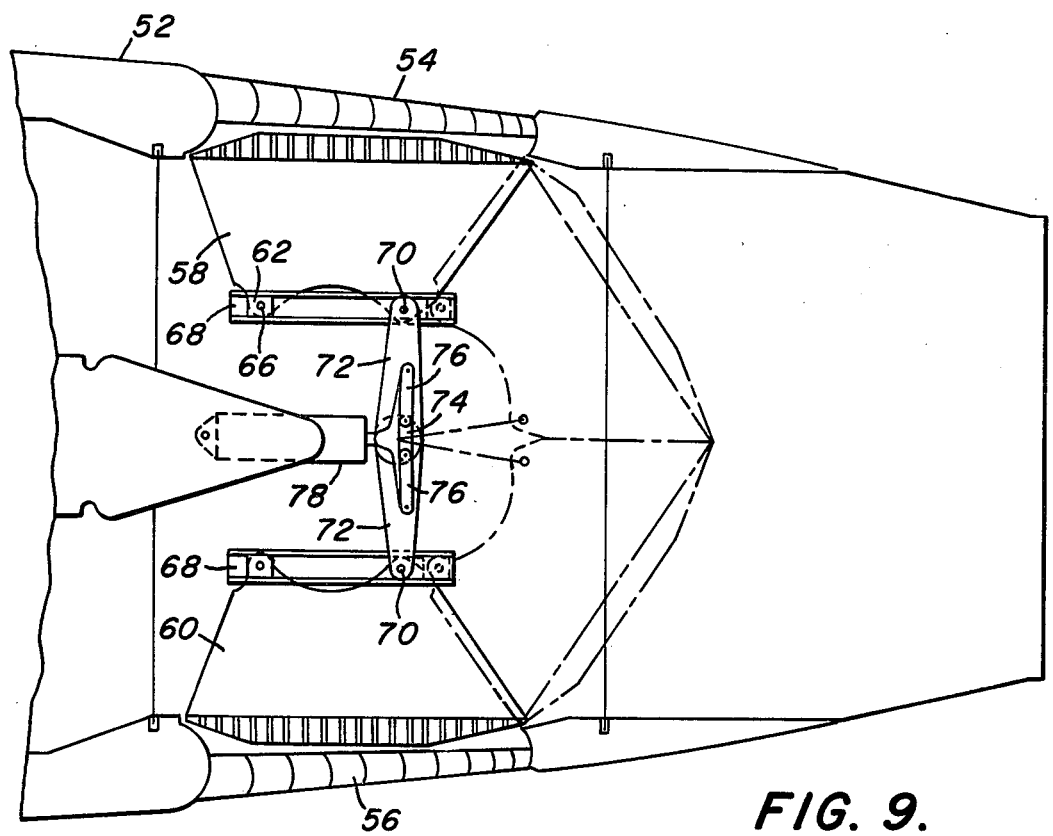
Figure 10:
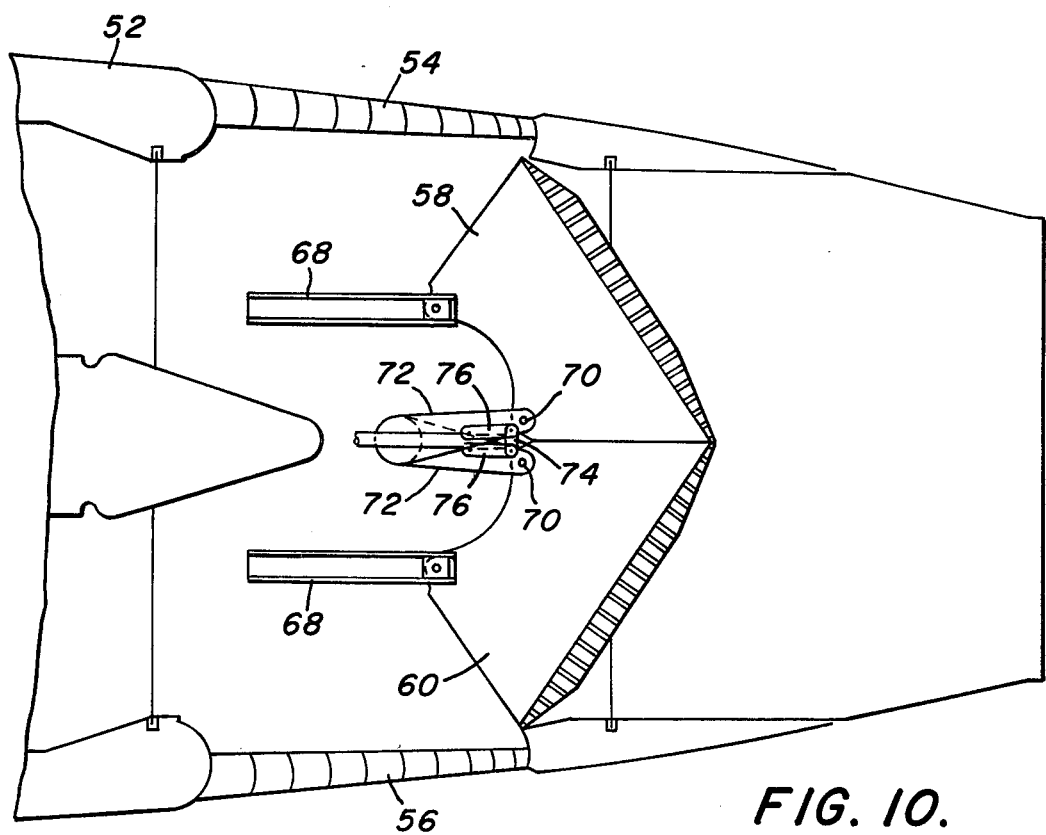

FIGS. 6A–6C schematically illustrate various operating conditions of the thrust reverser of the invention;

FIG. 7 is a cross-sectional view of an alternative embodiment of the invention wherein the discharge angles of the vane members of the cascade of the reverser are varied from front to rear;

FIGS. 8A and 8B are force diagrams illustrating the effect of variation in vane member discharge angle on effective downward and reverse thrust;

FIG. 9 illustrates an alternative embodiment of the invention as applied to a fan-jet engine with an axisymmetric exhaust system, showning the clamshell doors in their closed positions; and FIG. 10 is an illustration similar to FIG. 9 but showing the clamshell doors in their thrust-reversing positions.

Figure 1:
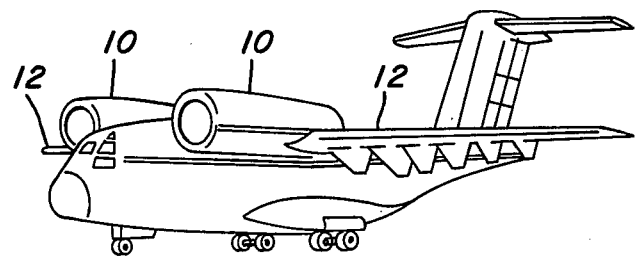
FIG. 1 is an illustration of one type of STOL aircraft with which the thrust reverser of the invention may be used.
Figure 2:
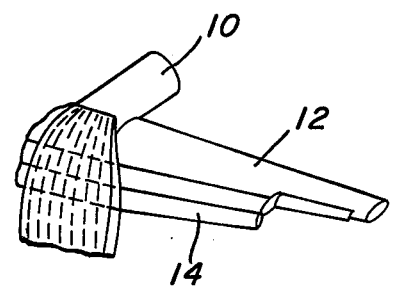
FIG. 2 is an illustration of the wing section of the aircraft of FIG. 1 showing the manner in which high lift effects are achieved.

With reference now to the drawings, and particularly to FIGS. 1 and 2, there is shown one type of aircraft with which the thrust reverser of the invention can be utilized; however it should be understood that the invention can be used on any type of aircraft. FIG. 1 shows a twin-engine aircraft which employs the upper surface blowing-powered lift concept. The engines 10 are mounted in front and above the wings 12. The engines exhaust over the wings; and the jet is deflected downwardly by inboard flaps 14 using the "Coanda" effect during STOL landing operations. Aircraft of this type operate at more than twice the thrust-to-weight ratio and lift coefficients and less than half the dynamic pressure of conventional jet transports. Therefore, all systems related to thrust and lift have a very strong impact on airplane control and flight safety. The thrust reverser about to be described is, of course, one of these systems.

Figure 3:
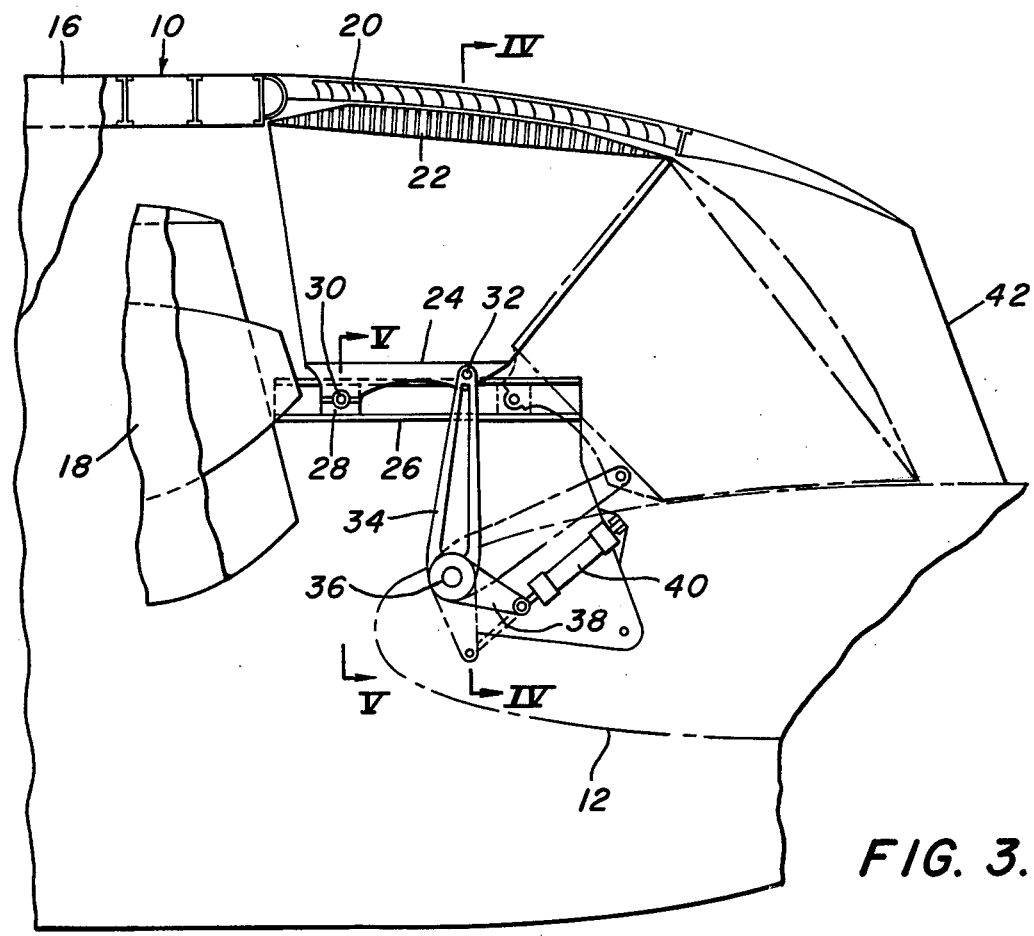
FIG. 3 is a cross section through an engine nacelle showing the clamshell door of the invention in closed position and covering the cascade formed in the wall of the nacelle.

With reference now to FIG. 3, the engine 10 includes a nacelle 16. The nacelle houses the engine itself, only the exhaust nozzle assembly 18 of the engine being shown in FIG. 3. Directly behind the exhaust nozzle assembly 18 and arranged in a generally semicircular configuration in the wall of the nacelle 16 is a cascade of vane members 20 (See FIG. 4 also) which extend over the upper portion of the nacelle 16 in a curved, generally semicircular configuration. Directly below the cascades 20 is a generally semicircular clamshell door 22 formed as a high-temperature material honeycomb structure. As shown in FIG. 3, the clamshell door 22 is longest at its upper extremity and tapers downwardly on each side to points where it is connected to mount fittings 24, only one of such mount fittings being shown in FIGS. 3, 4 and 5.

Figure 4:
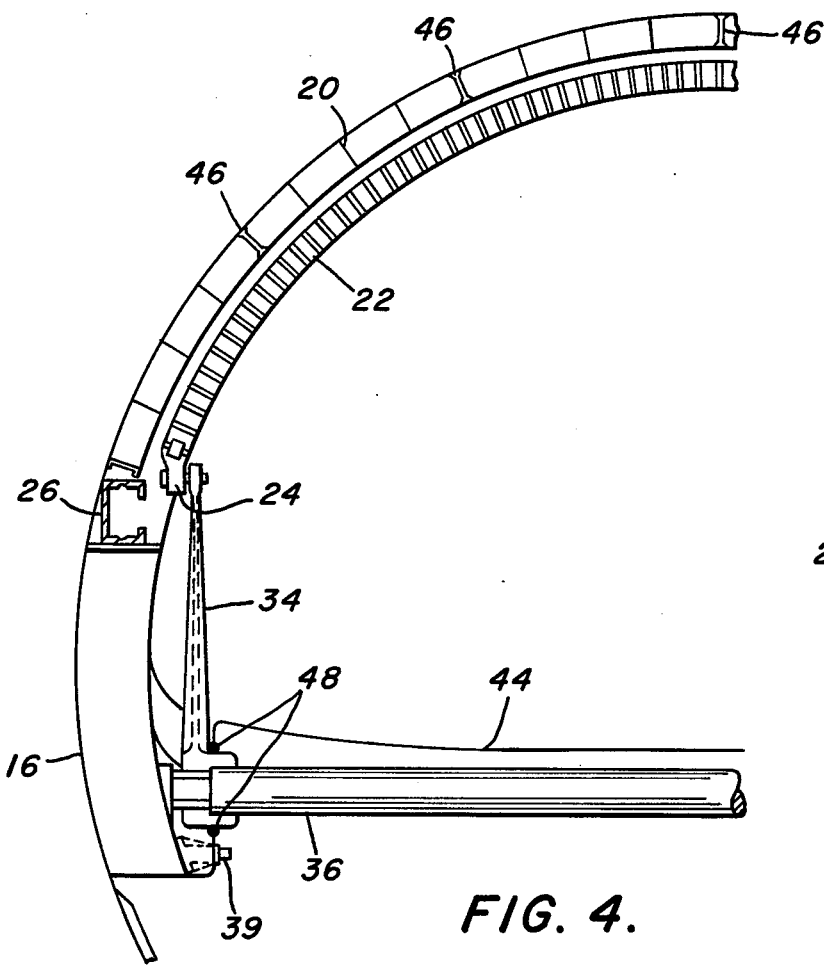
FIG. 4 is a cross-sectional view taken along line IV—IV of FIG. 3 showing the details of the clamshell door actuator of the invention.
Figure 5:
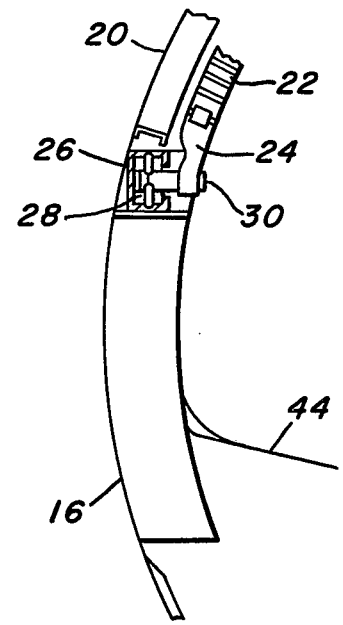
FIG. 5 is a cross-sectional view taken along line V—V of FIG. 3 showing the details of the guide track assembly for the clamshell door of the invention.

Directly beneath the fittings 24, and carried in the engine nacelle 16, are two tracks 26, only one of such tracks being shown in FIGS. 3, 4 and 5. Carried in each track 26 is a slide block 28 (FIG. 5) which is pivotally connected by a pin 30 to the fitting 24 on each side of the clamshell door 22. The aft end of the mount fitting 24 is pivotally connected at 32 to the free end of a driver link 34. The other end of each link 34 is connected to a rotatable torque tube 36 extending across the engine nacelle. Opposite ends of the torque tube are connected, in turn, through arms 38 to the piston rods of two hydraulic cylinders 40 on either side of the engine nacelle.

With the arrangement shown, driver link 34 will rotate in a clockwise direction when cylinders 40 are pressurized. This action initially slides the clamshell door 22 backwardly on the tracks 26. At the same time, rotation of links 34 gradually rotates the clamshell door 22 about pivot point 30 until it reaches the dotted-line position shown where it completely blocks the outlet or cruise nozzle 42 of the nacelle 16. Under these circumstances, and with the clamshell door in its fully-closed position, the exhaust gases from the nozzle 18 cannot flow through the nozzle 42 and will be directed upwardly through the cascades 20 in a generally forward direction to produce reverse thrust. A ramp or floor 44 extending across the bottom of the nacelle 16 forms a barrier between the hot gases passing through cruise nozzle 42 and the hydraulic cylinders 40 and their associated components. The structure that connects the ramp 44 with the nacelle 16 in the area of the links 34 forms a circular seal 48 around the link between the door arm 34 and the actuator arm 38 of the link. As shown in FIG. 4, the cascades are carried on strong-backs 46 which extend along the opening formed by the cascades between portions of the nacelle structure.

FIGS. 6A, 6B and 6C illustrate the operation of the reverser of the invention for full-forward thrust, full-reverse thrust and partial-reverser deployment. In the full-forward thrust condition (FIG. 6A), the clamshell door completely closes the cascades 20. Consequently, all of the efflux from the exhaust nozzle of the engine flows through the nacelle cruise nozzle 42 over the upper surface of the wing 12. In the full-reverse thrust condition (FIG. 6B), the clamshell door 22 completely blocks the cruise nozzle 42. Consequently, all of the efflux from the engine flows through the cascades 20 in the direction of arrow 46 to produce a reverse-thrust action. In FIG. 6C, partial-reverser deployment is shown wherein part of the efflux 48 passes through the cascades 20 and the remainder, identified by the reference numeral 50 flows through the cruise nozzle 42. Under these circumstances, the clamshell door 22 is intermediate its fully-closed and fully-open positions. The partial-reverser deployment illustrated in FIG. 6C provides for vigorous deceleration capability inflight. It can be used to improve the existing deceleration-descent capability of the aircraft or to replace the gear-down and/or inflight spoilers normally used as speed brakes. It is apparent that the thrust reverser should be deployed only partially during flight. If fully deployed, it would cut off all exhaust flow over the inboard wing and this would destroy virtually all lift over the width of the nozzle and reduce the induced lift on the wing outboard of the nozzle. Also, the complete loss of lift on the inboard wing would drastically alter the downwash flow field on the tail, causing a severe change in airplane pitching moments. Partial thrust reverser deployment minimizes lift loss and pitching moment change. A hydraulically-operated lock pin 39 limits the rotation of the links 38 inflight and retracts for ground operation to permit full-door deployment.

With reference to FIG. 7, an alternative embodiment of the invention is shown wherein elements corresponding to those of FIGS. 3–5 are identified by like reference numerals. In this case, however, it will be noted that the individual vanes in the cascade 20 have varying angles with respect to the surface of the nacelle 16. Thus, the first five vanes are disposed at an angle of 60° with respect to vertical, the next five vanes are disposed at an angle of 45° with respect to vertical, the third set of five vanes is disposed at an angle of 30° with respect to vertical, and the last five vanes are disposed at an angle of 15° with respect to vertical.

The variation in vane angle has several advantages. For example, during initial door deployment when the door 22 moves backwardly on tracks 26, a greater area of the cascade 20 may be exposed than is blocked off by movement of the trailing end of the door into the area of exhaust nozzle 42. The result is that the engine "feels" a larger discharge area. This over-area has no detrimental effect on engine operation if it happens for a short duration only (i.e., as a transitional condition in a two-position thrust reverser). However, as an inflight thrust reverser, clamshell door modulation is highly desirable, which means that the clamshell door may remain in intermediate positions for longer periods of time. Continuous operation of the engine with nozzle over-area may be detrimental to the engine low pressure compressor surge margin (i.e., low pressure shaft overspeed). To minimize the over-area in partial deployment, the cascades are tailored as shown in FIG. 7. The forward cascades are designed for high flow turning angles which produce a large reverse thrust and low downward thrust on the aircraft while the remaining vanes produce progressively greater amounts of downward thrust and less reverse thrust. This is illustrated in FIGS. 8A and 8B. When the vane angle is 60°, for example, the reverse thrust comprises 86.6% of the gross thrust while the downward thrust is 50% of the gross thrust. This condition is reversed when the vane angle decreases to 30° with respect to vertical (FIG. 8B). By providing vanes with larger forward angles at the forward end of the cascade, the flow discharge in the forward portion of the cascade is reduced since it must flow against the direction of movement of the aircraft. Consequently, the engine nozzle over-area during partially-deployed positions is reduced. At the same time, since the trailing vanes have low flow turning angles, a sufficient discharge area and reduced resistance to the efflux is provided for the fully-deployed position. The cascade tailoring in FIG. 7 also has a very beneficial side effect for partial inflight reversing. That is, the forward cascades direct the flow further forward than the untailored cascades of FIG. 3, for example, thus increasing the reverser effectiveness while at the same time reducing the reverse thrust download as illustrated in FIG. 8A.

FIGS. 9 and 10 illustrate an alternative embodiment of the invention for use on a jet engine installed in a generally axisymmetric nacelle, wing strut or aft body mounted configuration, and having the complete annular surface of the engine nacelle exposed. In this case, the nacelle 52 has upper and lower cascades 54 and 56 extending around the upper and lower halves of its outer surface. Instead of only a single clamshell door as in FIGS. 3-5, there are now two, one door 58 being above the centerline of the nacelle and the other door 60 being below. Both of the clamshell doors 58 and 60 are similar in construction to those shown in FIG. 3 and are pivotally connected at 62 to a slide block 66 which slides in a track 68. The opposite end of each clamshell door is pivotally connected at 70 to link arms 72 pivotal about point 74. The link arms, in turn, are connected through overcenter links 76 to the piston rod of hydraulic cylinders 78 on either side of the nacelle.

With the arrangement shown, the clamshell doors 58 and 60 will move from the positions shown in FIG. 9, where they cover the cascades 54 and 56, to the positions shown in FIG. 10 where they direct the exhaust gases from the engine through the cascades. Here, again, partial deployment of the clamshell doors is possible in order to effect inflight reversing and glide slope control of the aircraft.

The invention thus enables a large cascade opening in a thrust reverser arrangement by mounting the clamshell door on a four-bar linkage where the forward link is a straight track and the rear link is the driving link. During the first portion of deployment, the door essentially translates aft, with most of the rotation occurring toward the end of the deploy motion. This keeps the doors from interfering or binding against the cascades. It also opens up the cascade area before the cruise nozzle is blocked which will provide good cycle match during door transition and for partial deployment. If the reverser is utilized for inflight deployment, the lock pin 39 is provided to restrict the reverser deployment inflight within the failsafe portion of the stroke (i.e., the first 85% of the stroke).

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a jet-propulsion power plant having annular engine casing means and a jet engine enclosed within said casing means at the forward end thereof, the combination of thrust reverser means comprising a cascade of vane members in the wall of said casing means at the trailing end thereof and beyond the exhaust nozzle of the jet engine, a door normally covering said cascade, tracks means extending generally parallel to the longitudinal axis of the casing along the interior wall thereof beneath said cascade, an element reciprocable on each of said track means, means pivotally connecting the foward end of the door to the respective reciprocable elements, arm means having a free end pivotally connected to the trailing end of the door and pivotally mounted at its other end along an axis which is on the side of said door opposite said cascade, the arm means being essentially perpendicular to the track means when the door covers the cascade, and actuator means for rotating the arm means, the arrangement being such that upon rotation of the arm means in one direction, the door will move backwardly on said track means to expose the cascade, continued rotation of the arm means acting to pivot the door about its connection to the reciprocable elements to at least partially close the exit end of the engine casing and direct exhaust efflux from the engine through the cascade to produce a reverse thrust.

2. The combination of claim 1 wherein said reciprocable elements comprise slide blocks movable within said track means.

3. The combination of claim 1 wherein said door comprises a honeycomb structure.

4. The combination of claim 1 including hydraulic cylinder means for rotating said arm means in one direction to uncover said cascade of vane members and for rotating said arm means in the opposite direction to move said door to a position where it covers said cascade.

5. The combination of claim 4 including a ramp within said engine casing means at the bottom thereof, said ramp covering said hydraulic cylinder and acting to confine exhaust gases from the exhaust nozzle to the area above said hydraulic cylinder.

6. The combination of claim 1 wherein said engine casing means is mounted above the wing of an aircraft at the forward end thereof and said cascade of vane members is positioned at the top of said engine casing means only.

7. The combination of claim 1 wherein there are two cascades of vane members on opposite sides of said engine casing and wherein two doors normally cover said cascades, the doors being movable into positions where they can abut each other to deflect exhaust gases from the engine exhaust nozzle through said cascades.

8. The combination of claim 1 wherein said cascades of vane members and said door are generally semicircular in configuration.

9. The combination of claim 1 including means for limiting movement of said door into a position where it closes the exit end of the engine casing whereby at least a portion of the efflux from said engine will pass through the exit end of the engine casing during flight.

10. The combination of claim 1 wherein the vane members are tailored with the forward vanes having high flow turning angles deflecting exhaust efflux sharply toward the front of the power plant, the trailing vanes having lesser flow turning angles directing exhaust efflux in a greater upward direction, whereby a more uniform effective exit area progression during door transition will be effected for engine cycle match.

11. The combination of claim 10 wherein the forward vanes produce a greater reverse thrust and lesser downward thrust during inflight deployment of said door when only the forward vanes are exposed by the door.

* * * * *